United States Patent [19]

Tatemoto et al.

[11] 4,243,770

[45] Jan. 6, 1981

[54] CROSS LINKABLE FLUORINE-CONTAINING POLYMER AND ITS PRODUCTION

[75] Inventors: Masayoshi Tatemoto, Osaka; Takeshi Suzuki, Kyoto; Masayasu Tomoda, Osaka; Yasuyoshi Furukawa, Osaka; Yutaka Ueta, Osaka, all of Japan

[73] Assignee: Daikin Kogyo Co., Ltd., Osaka, Japan

[21] Appl. No.: 894,256

[22] Filed: Apr. 7, 1978

[30] Foreign Application Priority Data

Apr. 8, 1977 [JP] Japan ................................ 52-40543

[51] Int. Cl.$^2$ ........................ C08F 14/16; C08F 14/22
[52] U.S. Cl. .................................... 525/331; 526/249; 528/392; 568/683; 570/137
[58] Field of Search .................... 526/11.1, 249, 18; 528/392; 525/331; 260/653.1 R; 568/683

[56] References Cited

U.S. PATENT DOCUMENTS

| | | | |
|---|---|---|---|
| 3,002,031 | 9/1961 | Hauptschein et al. | 526/249 |
| 3,024,224 | 3/1962 | Herbst et al. | 526/249 |
| 3,467,636 | 9/1969 | Nersasian | 526/249 |
| 3,842,053 | 10/1974 | Villa et al. | 526/11.1 |
| 4,032,699 | 6/1977 | West | 526/249 |

*Primary Examiner*—Harry Wong, Jr.

*Attorney, Agent, or Firm*—Birch, Stewart, Kolasch & Birch

[57] ABSTRACT

An easily cross linkable fluorine-containing polymer substantially comprising: (1) a polymeric chain comprising one or more polymer segments, of which at least one polymer segment consisting of units of vinylidene fluoride alone or of units of vinylidene fluoride and one or more of other fluoroolefins, and (2) at least one iodine atom liberated from an iodinated compound of the formula: $RI_x$ (wherein R is a saturated or unsaturated fluorohydrocarbon or chlorofluorohydrocarbon residue having 1 to 8 carbon atoms and x is an integer of 1 or 2 corresponding to the bonding valency of the residue R) in an amount of 0.001 to 10% by weight based on the polymer and (3) a fragment of the iodinated compound excluding the said liberated iodine atom therefrom, which are bonded to the polymeric chain and being prepared by polymerizing vinylidene fluoride with or without one or more of the other fluoroolefins in the presence of a radical producing source and the iodinated compound or its reaction product with the said monomer(s) in one or more steps, the other fluoroolefins being selected from the group consisting of tetrafluoroethylene, chlorotrifluoroethylene, trifluoroethylene, vinyl fluoride, hexafluoropropylene, pentafluoropropylene, perfluoro(methyl vinyl ether), perfluoro(ethyl vinyl ether) and perfluoro(propyl vinyl ether).

20 Claims, No Drawings

CROSS LINKABLE FLUORINE-CONTAINING POLYMER AND ITS PRODUCTION

The present invention relates to an easily cross linkable fluorine-containing polymer and its production.

Fluorine-containing polymers in an elastomeric or non-elastomeric state are often subjected to cross linking for the purpose of enhancing their characteristic properties such as mechanical strength, liquid resistance and creep resistance. Thus, it is greatly advantageous that those polymers can be easily cross linked.

The present invention has been completed on the basis of a finding that a fluorine-containing polymer which can be readily controlled in molecular weight distribution and composition and which contains a certain specific amount of linked iodine in the molecule is cross linkable easily and simply in the presence of a cross linking source.

According to the present invention, there is provided an easily cross linkable fluorine-containing polymer substantially comprising: (1) a polymeric chain comprising one or more polymer segments, of which at least one polymer segment consisting of units of vinylidene fluoride alone or of units of vinylidene fluoride and one or more of other fluoroolefins, and (2) at least one iodine atom liberated from an iodinated compound of the formula: RIX (wherein R is a saturated or unsaturated fluorohydrocarbon or chlorofluorohydrocarbon residue having 1 to 8 carbon atoms and x is an integer of 1 or 2 corresponding to the bonding valency of the residue R) in an amount of 0.001 to 10% by weight based on the polymer and (3) a fragment of the iodinated compound excluding the said liberated iodine atom therefrom, which are bonded to the polymeric chain.

The term "linked iodine" herein used is intended to mean an iodine atom linked to a carbon atom in the chain of the fluorine-containing polymer. The carbon atom to which iodine is linked is in principle the terminal carbon atom. In the present invention, the linkage between the iodine atom and the terminal carbon atom can contribute effectively to the cross linking on the curing of the fluorine-containing polymer.

In the fluorine-containing polymer of the invention, the amount of linked iodine is dependent on the molecular weight of the polymer and is usually from about 0.001 to 10% by weight, preferably from about 0.01 to 5% by weight. When the amount of linked iodine is smaller than 0.001% by weight, curing of the polymer is insufficient. When it exceeds 10% by weight, the heat resistance of the polymer is deteriorated. The number of linked iodine per a molecule of the polymer is not particularly limited, provided that it is essentially 1 or more and the total amount of linked iodine does not exceed 10% by weight.

The fluorine-containing polymer having a linked iodine atom can be prepared by polymerizing the said monomer in the presence of a radical producing source and the iodinated compound by suspension or emulsion polymerization.

The carbon-iodine (C-I) linkage of the iodinated compound is a relatively weak one and is readily cleaved radically in the presence of a radical producing source. The high reactivity of the thus produced radical causes the propagation reaction of the monomer, and then the iodine atom is taken out from the iodinated compound to stop the reaction, whereby the fluorine-containing polymer in which iodine is linked to the carbon atom at the terminal of the molecule can be obtained. The thus formed linkage of the terminal of the fluorine-containing polymer with iodine is again cleaved radically with ease in the presence of a radical producing source to produce a radical having a similar reactivity. Therefore, by changing the kind of the monomer successively and repeating the polymerization one more or several times in the presence of the said fluorine-containing polymer, the propagation reaction of the monomer is caused at each polymerization step as mentioned above to afford a fluorine-containing segmented copolymer in which two kinds or more of segments corresponding to the kind of each monomer are chemically linked and linked iodine is present. Detailed explanation of such fluorine-containing segmented copolymers and their production processes is given in Reference Examples as hereinafter presented.

Thus, the fluorine-containing polymer of the invention comprises a homopolymer or random copolymer consisting of a polymeric chain of substantially single kind and also a segmented copolymer consisting of a polymeric chain in which substantially two kinds of more of segments are chemically linked. Especially the latter possesses various interesting properties which can not be obtained by conventional blending processes.

In the fluorine-containing polymer of the invention, the polymer chain may consist of only one polymer segment having a number average molecular weight of 8,000 to 400,000 and containing units of vinylidene fluoride in an amount of not less than about 10 mol% based on the polymer segment. Also, the polymeric chain may consist of two to four polymer segments, have a number average molecular weight of about 8,000 to 4,000,000 and contain units of vinylidene fluoride in an amount of not less than about 10% by weight based on the polymeric chain. In the case that each segment in the polymeric chain consists of two kinds or more of monomers, the same kind of monomers may be used in varying proportion. The constituting segments are not necessarily required to be different each other in the whole portions of the polymeric chain. The sufficient condition is that at least two kinds of segments are present in the polymeric chain and at least one of them is a fluorine-containing segment.

The said iodide compound contains 1 or 2 of linked iodine atoms and is stable in such a degree that undesirable side reaction does not occur under the polymerization conditions. R is a saturated or unsaturated, fluorohydrocarbon or chlorofluorohydrocarbon residue (which may include a functional group such as —O—, —S—, RN=, —COOH, —SO$_3$H and —PO$_3$H) usually having 1 to 8 carbon atoms. It is preferable that the carbon atom adjacent to the iodine atom bears at least one fluorine atom or perfluorohydrocarbon residue.

As the iodide compund, there may be exemplified monoiodoperfluoromethane, monoiodoperfluoroethane, monoiodoperfluoropropane, monoiodoperfluorobutane (e.g., 2-iodoperfluorobutane, 1-iodoperfluoro(1,1-dimethylethane)), monoiodoperfluoropentane (e.g. 1-iodoperfluoro(4-methylbutane)), 1-iodoperfluoro-n-octane, monoiodoperfluorocyclobutane, 2-iodoperfluoro(1-cyclobutyl)ethane, monoiodoperfluorocyclohexane, monoiodotrifluorocyclobutane, monoiododifluoromethane, monoiodomonofluoromethane, 2-iodo-1-hydroperfluoroethane, 3-iodo-1-hydroperfluoropropane, monoiodomonochlorodifluoromethane, monoiododichloromonofluoromethane, 2-iodo-1,2-dichloro-1,1,2-trifluoroethane, 4-iodo-1,2-dichloroperfluorobutane, 6-iodo-1,2-dichloroperfluorohexane, 4-iodo-1,2,4-trichloroperfluorobutane, 1-iodo-2,2-dihydroperfluoropropane, 1-iodo-2-hydroperfluoropropane, monoiodotrifluoroethylene, 3-iodoperfluoropropene-1, 4-iodoperfluoropentene-1, 4-iodo-5-chloroperfluoropentene-1,2-iodoperfluoro(1-cyclobutenylethane), 1,3-diiodoperfluoro-n-propane, 1,4-diiodoperfluoro-n-butane, 1,3-diiodo-2-chloroperfluoro-n-propane, 1,5-diiodo-2,4-dichloroperfluoro-n-pentane, 1,7-diiodoperfluoro-n-octane, 1,2-di(iododifluoromethyl)perfluorocyclobutane, 2-iodo-1,1,1-trifluoroethane, 1-iodo-1-hydroperfluoro(2-methylethane), 2-iodo-2,2-dichloro-1,1,1-trifluoroethane, 2-iodo-2-chloro-1,1,1-trifluoroethane, 2-iodoperfluoroethylperfluorovinyl ether, 2-iodoperfluoroethyl perfluoroisopropyl ether, 3-iodo-2-chloroperfluorobutyl perfluoromethyl thioether, 3-iodo-4-chloroperfluorobutyric acid, etc.

These iodide compounds may be prepared by conventional methods. For example, 2-iodoperfluoropropane can be obtained by the reaction of hexafluoropropene with iodine in the presence of potassium fluoride; 1,5-diiodo-2,4-dichloroperfluoro-n-pentane can be prepared by the reaction of silver salt of 3,5-dichloroperfluoro-1,7-heptanedicarboxylic acid with iodine; and 4-iodo-5-chloroperfluoro-1-pentene can be obtained by the reaction of perfluoro-1,4-pentadiene with iodine chloride.

The fluorine-containing polymer favorable for the cross linking property is the one containing substantially a homopolymer of vinylidene fluoride or a random copolymer of vinylidene fluoride with at least one of other fluoroolefins copolymerizable therewith. The most favorable one is (1) the said homopolymer or random copolymer containing 10 mol% or more of vinylidene fluoride units and having a number average molecular weight of about 8,000 to 400,000 (determined by the osmotic pressure method) or (2) the segmented copolymer in which at least 10% by weight of the said homopolymer or random copolymer as segment is contained and at least one kind of other fluorine-containing polymer segments having the monomer units as the substantial constitution is linked therewith and which has a number average molecular weight of about 8,000 to 400,000. Examples of the said other fluoroolefins are tetrafluoroethylene, chlorotrifluoroethylene, trifluoroethylene, vinyl fluoride, hexafluoropropylene, pentafluoropropylene, perfluoro(methyl vinyl ether), perfluoro(ethyl vinyl ether), perfluoro(ethyl vinyl ether), etc.

As the radical producing source to be used in the production of the fluorine-containing polymer, light or heat may be preferably employed. In case of light, infrared to ultraviolet rays, particularly not containing chemical ultraviolet rays, may be used. Chemical ultraviolet rays may sometimes produce radicals also from linkages other than the I-C linkage and is thus not necessarily ideal. In case of initiating the reaction with heat alone, a temperature of at least 100° C. or higher, preferably 200° C. or higher, is necessitated. Ionizing radiation may be also utilizable, but it produces radical indiscriminately in essence and is thus undesirable. Further, appropriate radical initiators such as inorganic or organic peroxides, azo compounds, organometallic compounds and metals may be also employed depending on the form of the polymerization. Examples of the preferable radical initiators are persulfates, hydrogen peroxide, $(R'CO)_2O_2$, $R'OOR'$, $(R')_3COOC(O)OC(R')_3$, $N_2F_2$, $R'-N=N-R'$, $HgR'_2$, Li, K, Na, Mg, Zn, Hg, Al, etc (Rf' being a polyfluoroalkyl group).

The polymerization temperature may be optionally selected from such range that the radical reaction takes place but thermal decomposition of the produced polymer chain does not occur. Usually, a temperature of $-20°$ to 150° C. is adopted. In case of using heat as the radical producing source, a higher temperature, sometimes of about 250° C., is necessitated.

As to the polymerization pressure, there is no particular limitation. In usual, a pressure equal to or lower than the autogenous pressure of the monomers participating in the polymerization may be adopted.

As the medium for solution polymerization, the one in which chain transfer is hardly caused is preferable. For example, the following solvents may be favorably employed:

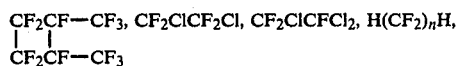

$CF_2CF-CF_3$, $CF_2ClCF_2Cl$, $CF_2ClCFCl_2$, $H(CF_2)_nH$,
$CF_2CF-CF_3$

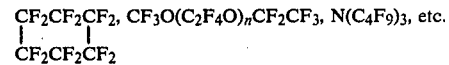

$CF_2CF_2CF_2$, $CF_3O(C_2F_4O)_nCF_2CF_3$, $N(C_4F_9)_3$, etc.
$CF_2CF_2CF_2$

In case the emulsion polymerization, the use of an emulsifier is usually desirable. When the produced polymer has a surface active effect, for instance, in case of containing a hydrophilic group such as $-COOM$, $-OH$ or $-SO_3M$ (M being hydrogen, metal or any other cation), the use of an emulsifier is not necessarily required. As the emulsifier, a fluorine-containing one such as a salt of fluorine-containing carboxylic acid or fluorine-containing sulfonic acid is favorably employed. The amount of the emulsifier to be used is usually 5% by weight or less to the amount of water. A chain transfering agent may be also employed, but desirable result is not obtained in general.

In the present invention, any of the fluorine-containing polymers in viscous liquid or solid state may be employed, provided that it contains the I-C bond. Some of the fluorine-containing polymers show an intrinsic viscosity $[\eta]$ (dl/g) of about 0.1 or larger, preferably 0.15 to 2.0, when determined at 35° C. in a solvent being able to dissolve the polymer (for instance, the solvent described in Reference Examples mentioned below).

The iodine-linked polymer of the invention is cross linkable characteristically as mentioned above in the presence of a cross linking source. As the cross linking source, high energy electromagnetic waves such as radioactive rays (e.g. $\gamma$-rays, electron rays, $\alpha$-rays, $\beta$-rays, X-rays) and ultraviolet rays may be employed, but the use of a cross linking agent such as organic peroxides, polyamines, polyhydroxy compounds and polythiol compounds is more favorable. The amount of such cross linking agent to be used is usually 0.05 to 10 parts by weight, preferably 1.0 to 5 parts by weight, to 100 parts by weight of the polymer.

As the organic peroxide, the one readily producing a peroxy radical under heating or in the oxidation-reduction system is usually desired. Examples of such peroxides are 1,1-bis(t-butylperoxy)-3,5,5-trimethylcyclohexane, 2,5-dimethylhexane-2,5-dihydroxyperoxide, di-t-butylperoxide, t-butylcumylperoxide, dicumylperoxide, $\alpha,\alpha'$-bis(t-butylperoxy)-p-diisopropylbenzene, 2,5-dimethyl-2,5-di(t-butylperoxy)hexane, 2,5-dimethyl-2,5-di(t-butylperoxy)hexene-3, benzoyl peroxide, t-butylperoxybenzene, 2,5-dimethyl-2,5-di(benzoylperoxy)hexane, t-butylperoxymaleic acid, t-butylperoxyisopropyl carbonate, etc. Among them, the dialkyl type compound is the most preferable. In usual, the kind and the amount of the peroxide to be used are determined depending on the amount of active —O—O—, the decomposition temperature, etc.

In case of using the organic peroxide, a remarkable effect can be obtained by the combined use of a cross linking aid or a co-cross linking agent. As the cross linking aid or co-cross linking agent, any one having a reactivity to peroxy radical and polymer radical may be effectively employed in principle. Preferable examples are polyfunctional compounds such as triallyl cyanurate, triallyl isocyanurate, triacrylformal, triallyl trimellitate, N,N'-m-phenylenebismaleimide, dipropargyl terephthalate, diallyl phthalate, tetraallyl terephthalamide, polybutadiene, etc. The amount to be used is 0.1 to 10 parts, preferably 0.5 to 5 parts, to 100 parts of the polymer. Further, as a blendable, co-cross linking substance, silicone oil, silicone rubber, ethylene-vinyl acetate copolymer, 1,2-polybutadiene, fluorosilicone oil, fluorosilicone rubber, fluorophosphazen rubber, hexafluoropropylene-ethylene copolymer, and tetrafluoroethylene-propylene copolymer may be also employed. The fluorine-containing polymer of the invention which can take an olefin structure by iodide-eliminating reaction by utilizing the reactivity of the terminal iodine is also used as the blendable co-cross linking substance. The amount of such substance to be used is not particularly limited, but it is not desirable to use it in such a large amount as deteriorating the essential quality of the fluorine-containing polymer.

The polyamine compound may be a primary or secondary amine having two or more basic nitrogen atoms in the molecule. In many cases, it is used in a salt form so as to make the reactivity milder. In usual, the use of alkylenediamines, especially, ethylenediamine carbamate, hexamethylenediamine carbamate, 4,4'-diaminocyclohexylmethane carbamate, etc. is preferable. Schiff's bases such as N,N'-dicinnamylidene-1,6-hexamethylenediamine are also employed frequently. Further, poorly basic polyamine aromatic compounds may be employed advantageously in combination with other basic compounds. Examples of the other basic compounds are diphenylguanidine, di-O-triguanidine, diphenylthiourea, 2-mercaptoimidazoline, etc. Accelerators for synthetic rubbers containing —NH$_2$ and/or —NH— in the molecule, divalent metal hydroxide and the like are also usable. The amount of the polyamine compound to be used is about 0.5 to 5 parts to 100 parts of the polymer.

As the polyhydroxy compound, there may be employed polyhydroxy compounds containing an enol type hydroxyl group=C—OH, dihydroxy compounds represented by the formula: R"(CH$_2$OH)$_2$ wherein R" is a polyfluoroalkylene or perchlorofluoroalkylene group having 1 to 20 carbon atoms, or their alkali metal salts, or their mixtures. Preferable examples of such compounds are hydroquinone, 2,2-bis(4-hydroxyphenyl)propane, 2,2-bis(4-hydroxyphenyl)perfluoropropane, 2,2-bis(4-hydroxyphenyl)butane, 1,1-bis(4-hydroxyphenyl)methane, 4,4'-dihydroxydiphenyl ether, HOCH$_2$(CF$_2$)$_3$-CH$_2$OH, HOCH$_2$CF$_2$CFH(CH$_2$)$_3$CFHCF$_2$CH$_2$OH, HOCH$_2$CH$_2$CH$_2$(CF$_2$)$_3$CH$_2$-CH$_2$CH$_2$OH, HOCH$_2$CF$_2$CH$_2$(CF$_2$)$_3$CH$_2$CF$_2$CH$_2$OH or their alkali metal salts.

As the polythiol compound, aliphatic or aromatic dithiols are usually employed. Specific examples thereof are dimercaptodimethyl ether, dimercaptomethyl sulfide, 1,6-hexanedithiol, ethylenebismercapto acetate, 1,5-naphthalene dithiol, 4,4'-dimethcaptodiphenyl, or their alkali metal salts.

The cross linking of the polymer of the invention is achieved in the presence of a divalent metal oxide or hydroxide as an acid accepting agent in addition to the above mentioned cross linking source. The divalent metal oxide or hydroxide may be, for example, an oxide or hydroxide of Ca, Mg, Pb, Zn, etc. Their complex salts may be also utilizable. These compounds not only serve as the acid accepting agent but also contribute to improvement of the cross linking reactivity, the mechanical property and the heat resistance. Further, suitable cross linking accelerators such as tertiary amines, trisubstituted amidines, pentasubstituted guanidines or their organic or inorganic acid salts, quaternary ammonium salts or quaternary phosphonium salts may be also employed. As to such cross linking accelerators, detailed description is given in Japanese Patent Publication (unexamined) Nos. 56854/1976, 1387/1972 and 191/1972. For the purpose of iodine-elimination of the polymer of the invention, weak acid salts of monovalent metals such as Na, K, Ag and Cu may be employed.

The composition of the invention may also contain pigments, fillers, reinforcing agents, etc. Preferable examples of the fillers or the reinforcing agents are carbon black, TiO$_2$, SiO$_2$, clay and talc as inorganic materials and fluorine-containing polymers such as polytetrafluoroethylene, polyvinylidene fluoride, polyvinyl fluoride, polychlorotrifluoroethylene, tetrafluoroethylene-ethylene copolymer and tetrafluoroethylene-vinylidene fluoride copolymer as organic materials.

The mixation of the above components may be effected by an appropriate procedure depending on their viscoelasticity and state. In case of the components being in a solid state, a conventional open roll or powder mixer is usable. In case of a liquid state, a conventional mixer may be employed. It is also possible to dissolve or disperse the components in a solid state in a solvent to obtain a dispersed mixture.

The fluorine-containing polymer of the invention is utilizable, for example, as a plastic material, a sealant, an adhesive or a paint in the field where heat resistance, oil resistance, chemical resistance, solvent resistance, etc. are highly required.

The present invention will be hereinafter explained further in detail by the following Reference Examples, Control Examples, Examples and Comparative Examples. The Reference Examples concern to the production of the fluorine-containing polymer according to the invention to be used in the Examples. The Control Examples concern to the production of the polymer to be used in the Comparative Examples.

Throughout those examples, % and part(s) are by weight, unless otherwise indicated. Further, the abbreviations have the following meanings: VdF, vinylidene fluoride; HFP, hexafluoropropylene; TFE, tetrafluoroethylene; BIM, bromotrichloromethane; PVdF, polyvinylidene fluoride; 6FI, 2-iodoperfluoropropane.

REFERENCE EXAMPLE 1

(1) In a 3000 ml volume reaction tank, pure water (1500 ml) and ammonium perfluorooctanoate (7.5 g) were charged, and the air in the tank was replaced by a gaseous mixture of VdF/HFP (molar ratio, 45/55) to make a pressure of 14 kg/cm$^2$G. After addition of CF$_2$(CFClCF$_2$I)$_2$ (0.5 ml) (25° C.), a 3% aqueous solution of ammonium persulfate (10 ml) was added thereto under pressure at 30° C. while stirring. After about 1 hour, lowering of the pressure occurred. When the pressure was reduced to 13 kg/cm$^2$G, a gaseous mixture is VdF/HFP (molar ratio, 78/28) was introduced to elevate the pressure again up to 15 kg/cm$^2$G. In this manner, the pressure was kept in a range of 13 to 15 kg/cm$^2$G during the polymerization. After 10.8 hours, the temperature was lowered rapidly and the pressure was reduced to stop the polymerization. At the time after lapse of 7 hours of the reaction, a 0.5% aqueous solution of ammonium persulfate (10 ml) was added under pressure, but only a slight increase in the polymerization rate was observed. Almost constant polymerization rate was thus kept during the polymerization. The solid content of the produced dispersion was 11%.

(2) In the same reaction tank as above, the dispersion obtained in (1) (500 ml) and pure water (500 ml) were charged, and after the pre-treatment was effected in the same manner as in (1), a 0.2% aqueous solution of ammonium persulfate (10 ml) was added under pressure to initiate the polymerization reaction. The polymerization rate was smaller than that in (1) in proportion to the dilution of particles. The reaction was continued for 14 hours during which a 0.2% aqueous solution of ammonium persulfate (5 ml) was added under pressure every 4 hours. Then, the polymerization was stopped by rapid cooling and lowering of pressure. The solid content of the produced dispersion was 20.8%. After freezing coagulation, water washing and drying of this dispersion, a rubbery polymer having an intrinsic viscosity [η] of 1.09 (dl/g, 35° C.) in methyl ethyl ketone and a number average molecular weight of 265,000 was obtained.

(3) In the same reaction tank as above, the dispersion obtained in (2) (400 ml) and pure water (600 ml) were charged, and the air in the tank was replaced by TFE. The pressure was elevated up to 9.5 kg/cm$^2$G at room temperature under stirring, a monomer mixture of TFE/ethylene (molar ratio, 55/45) was introduced to make a 13.5 kg/cm$^2$G and then the reaction was continued for 3 hours with addition of the said monomer mixture, during which the polymerization rate was gradually lowered. The solid content of the produced dispersion was 8.8%. Freezing coagulation of this dispersion, followed by water washing and drying gave rubbery powder insoluble in acetone. The proportion of the TFE/ethylene polymer segment was 13%.

REFERENCE EXAMPLE 2

(1) In a 3000 ml volume reaction tank, pure water (1500 ml) and ammonium perfluorooctanoate (7.5 g) were charged, and the air in the tank was replaced by a gaseous mixture of VdF/HFP (molar ratio, 45/55) to make a pressure of 14 kg/cm$^2$G. After addition of CF$_2$(CFClCF$_2$I)$_2$ (0.5 ml) (25° C.), a 10% aqueous solution of ammonium persulfate was added under pressure at 80° C. while stirring. The polymerization was initiated immediately and lowering of the pressure occurred. When the pressure was reduced to 13 kg/cm$^2$G, a gaseous mixture of VdF/HFP (molar ratio, 78/28) was introduced to elevate the pressure again up to 15 kg/cm$^2$G. In this manner, the pressure was kept in a range of 13 to 15 kg/cm$^2$G during the polymerization. After 2 hours, the temperature was rapidly lowered and the pressure was reduced to stop the polymerization.

The product was a white, translucent dispersion with vigorous foaming. The solid content was 11% by weight. Freezing coagulation of this dispersion, followed by water washing and drying gave a rubber having an iodine content of 0.31% and an intrinsic viscosity [η] of 0.34 (dl/g, 35° C.) in methyl ethyl ketone and a number average molecular weight of 49,000.

(2) In the same reaction tank as above, the dispersion obtained in (1) (550 ml) and pure water (450 ml) were charged, and the polymerization reaction was effected for 4.5 hours in the same manner but not using ammonium persulfate. The polymerization rate became smaller in proportion to the dilution of the initial dispersion, and thus a proportional relationship with the number of polymer particles of the dispersion was clearly confirmed. The solid content of the produced dispersion was 24%. After freezing coagulation, water washing and drying of this dispersion, a rubber having an iodine content of 0.051%, an intrinsic viscosity [η] of 0.86 (dl/g, 35° C.) in methyl ethyl ketone and a number average molecular weight of 187,000 was obtained.

(3) In the same reaction tank as above, the dispersion obtained in (2) (500 ml) and pure water (500 ml) were charged, and the polymerization was carried out for 14.5 hours as in (2). Although the polymerization rate was kept almost constant, a tendency to slight decrease thereof was observed, so that a 0.4% aqueous solution of sodium ammonium persulfate (6 ml) was supplementally added under pressure every 4 hours after initiation of the polymerization. The solid content of the produced dispersion was 37%. The intrinsic viscosity [η] of the thus obtained rubber was 1.51 (dl/g, 35° C.) in methyl ethyl ketone. The number average molecular weight was 420,000.

(4) In the same reaction tank as above, the dispersion obtained in (2) (500 ml) and pure water (500 ml) were charged, and the air in the tank was replaced by VdF. Without addition of an initiator, the pressure was elevated up to 22 kg/cm$^2$G at 80° C., whereby the polymerization was initiated immediately, and after 50 minutes, lowering of the pressure of 2.4 kg/cm$^2$G was observed. At this time, the polymerization was stopped by rapid lowering of the temperature and reduction of the pressure. The product was an aqueous dispersion having a solid content of 15%. Freezing coagulation of this dispersion, followed by water washing and drying gave a polymer in poorly adhesive rubber powder form having an iodine content of 0.047% and an intrinsic viscosity [η] of 1.26 (dl/g, 35° C.) in dimethylformamide. The content of the PVdF segment was 9.7%. This substance was soluble in hot acetone.

(5) In the same reaction tank as above, the dispersion obtained in (3) (500 ml) and pure water (500 ml) were charged, and the polymerization was effected as in (4). After lapse of 20 minutes, reduction of the pressure was not observed. When a 0.2% aqueous solution of ammonium persulfate was added under pressure at this time, the pressure began to lower immediately, and reduction of 5 kg/cm$^2$G was observed after 80 minutes, at which time the polymerization was stopped. The solid content of the produced dispersion was 23%. By freezing coagulation, water washing and drying of this dispersion, a powdery rubber having an intrinsic viscosity [η] of 1.64 (dl/g, 35° C.) in dimethylacetamide was obtained. The content of the PVdF segment corresponded to 12%.

(6) In the same reaction tank as above, the dispersion obtained in (3) (250 ml) and pure water (750 ml) were charged, and the air in the tank was replaced by TFE.

The pressure was elevated up to 9.3 kg/cm²G at room temperature while stirring. Then, VdF was introduced to further elevate the pressure up to 12.2 kg/cm²G, and after rapid elevation of the temperature to 70° C. (14 kg/cm²G), a 0.1% aqueous solution of ammonium persulfate (10 ml) was added under pressure, whereby the pressure began to lower immediately. After lapse of 11 minutes and when the pressure was lowered to 12.3 kg/cm²G, the polymerization was stopped by rapid lowering of the temperature and reduction of the pressure. The produced dispersion was subjected to coagulation, washing and drying to obtain a rubber hardly soluble in hot acetone. The content of the TFE/VdF segment was 10%, monomer ratio of TFE/VdF in this segment was 75/25 (molar ratio).

REFERENCE EXAMPLE 3

(1) In a 35 liter volume reaction tank, demineralized pure water (15 kg) and ammonium perfluorooctanoate (0.075 kg) were charged, and the air in the tank was replaced by HFP under stirring. The pressure was elevated up to 12 kg/cm²G at 80° C. with a monomer mixture of HFP/VdF (molar ratio, 55/45), and 6FI (0.0234 kg) was introduced under pressure at the same time. Then, a solution of ammonium persulfate (0.01 kg) in pure water (0.05 kg) was added thereto under pressure. The polymerization was immediately initiated to reduce the pressure, so that a gaseous monomer mixture of HFP/VdF (molar ratio, 21/79) was supplied to keep the pressure at a constant level during the reaction. Almost all amount of 6FI was consumed at the initial stage of the reaction. After 5 hours, the pressure was reduced to stop the reaction. The product was a white aqueous dispersion having a polymer content of 13%. After freezing coagulation and water washing, a polymer having a HFP content of 20 mol % and an iodine content of 0.38% was obtained.

(2) In a 3 liter volume reaction tank, the dispersion obtained in (1) (1000 ml) and pure water (500 ml) were charged, and the air in the tank was replaced by a gaseous mixture of HFP/VdF/TFE (molar ratio, 37.0/46.5/16.5). The pressure was elevated up to 14 kg/cm²G, and the temperature was rapidly raised to 80° C. An aqueous solution of ammonium persulfate (20 mg) was added thereto under pressure while stirring, whereby the pressure began to lower immediately. The reaction was continued for 16 hours during which the pressure was kept to a constant level by supply of a gaseous mixture of HFP/VdF/TFE (molar ratio, 17.0/65.5/17.5) and ammonium persulfate (20 mg) was supplementally added every 4 hours. Then, the temperature was rapidly lowered and the pressure was reduced to stop the reaction. The produced dispersion had a solid content of 26%. The rubber isolated therefrom showed an iodine content of 0.095%.

(3) In a 3 liter volume reaction tank, the dispersion obtained in (1) (500 ml) and pure water (500 ml) were charged, and the air in the tank was replaced by VdF. The pressure was elevated up to 22 kg/cm²G at 80° C. Then, a 0.5% aqueous solution of ammonium persulfate (6 ml) was added thereto under pressure while stirring to initiate the polymerization. Since lowering of the pressure began immediately, VdF was supplied to keep the pressure to a constant level during the polymerization for 1.5 hours. Then, the temperature was lowered to room temperature and the pressure was reduced at the same time to stop the polymerization. The product was a white dispersion partially coagulated. From this dispersion, a powdery polymer (205 g) was obtained by a conventional procedure. The iodine content of the thus obtained polymer was 0.12%.

REFERENCE EXAMPLE 4

(1) In a 3 liter volume reaction tank, pure water (1500 ml) and ammonium perfluorooctanoate (7.5 g) were charged, and the air in the tank was replaced by a gaseous mixture of VdF/HFP (molar ratio, 45/55). Then, $CF_2=CFCF_2CFICF_2Cl$ (1 ml) (25° C.) was introduced therein to elevate the pressure up to 14 kg/cm²G, and after the temperature was raised to 80° C. under stirring, a 10% aqueous solution of ammonium persulfate (10 ml) was added under pressure, whereby the polymerization was immediately initiated to cause lowering of the pressure. When the pressure was lowered to 13 kg/cm²G, a gaseous mixture of VdF/HFP (molar ratio, 78/22) was introduced to elevate the pressure again up to 15 kg/cm²G. In this manner, the pressure was kept to a range of 13 to 15 kg/cm²G during the polymerization. After 2.5 hours, the polymerization was stopped by rapid lowering of the temperature and the reduction of the pressure. The product was a white aqueous dispersion having a solid content of 11%. The rubber isolated from this dispersion showed an iodine content of 0.53%, an intrinsic viscosity [$\eta$] of 0.28 (dl/g, 35° C.) in methyl ethyl ketone and a number average molecular weight of 33,000.

(2) In the same reaction tank as above, the dispersion obtained in (1) (500 ml) and pure water (500 ml) were charged, and the polymerization was carried out for 8.5 hours in the same manner but not using ammonium persulfate. The solid content of the produced dispersion was 20%. The rubber isolated therefrom had an iodine content of 0.11%, an intrinsic viscosity [$\eta$] of 0.59 (dl/g, 35° C.) in methyl ethyl ketone and a number average molecular weight of 90,000.

REFERENCE EXAPLE 5

(1) In a 3 liter volume reaction tank, pure water (1500 ml) and ammonium perfluorooctanoate (7.5 g) were charged, and the air in the tank was replaced by a gaseous mixture of HFP/VdF/TFE (molar ratio, 37.0/46.5/16.5). The pressure was elevated up to 12 kg/cm²G, and $CF_2=CFCF_2CFICF_2Cl$ (1 ml) (25° C.) was added thereto. Then, a 10% aqueous solution of ammonium persulfate (10 ml) was added under pressure at 80° C. while stirring, whereby the polymerization was immediately initiated to cause lowering of the pressure. When the pressure was lowered to 11 kg/cm²G, a gaseous mixture of HFP/VdF/TFE (molar ratio, 17.0/65.5/17.5) was introduced to elevate the pressure again up to 12 kg/cm²G. In this manner, the pressure was kept to a range of 1 to 12 kg/cm²G during the polymerization. After 2 hours, the polymerization was stopped by rapid lowering of the temperature and reduction of the pressure. The product was a white aqueous dispersion having a solid content of 12%. The rubber isolated therefrom showed an iodine content of 0.48%, an intrinsic viscosity [$\eta$] of 0.30 (dl/g, 35° C.) in methyl ethyl ketone and a number average molecular weight of 37,000.

(2) In the same reaction tank as above, the dispersion obtained in (1) (500 ml) and pure water (500 ml) were charged, and the polymerization was carried out for 6.5 hours in the same manner but not using ammonium persulfate. The produced dispersion had a solid content of 19%. The rubber isolated therefrom had an iodine content of 0.13%, an intrinsic viscosity [η] of 1.10 (dl/g, 35° C.) in methyl ethyl ketone and a number average molecular weight of 206,000.

(3) In the same reaction tank as above, the dispersion obtained in (2) (200 ml) and pure water (800 ml) were charged, and the pressure was elevated up to 5 kg/cm²G with introduction of TFE at 70° C. without using ammonium persulfate to initiate the polymerization. The pressure began to lower immediately. After 8 minutes and when the pressure became 4.5 kg/cm²G, TFE was introduced to elevate the pressure. When the pressure became 4 kg/cm²G after 10 minutes, the polymerization was stopped by the reduction of the pressure. From the produced dispersion, rubber polymer granules were obtained by a conventional procedure. This polymer was hardly soluble in methyl ethyl ketone. The content of the TFE segment was 18%, and the iodine content was 0.10%.

REFERENCE EXAMPLE 6

In a 3 liter volume reaction tank, pure water (1500 ml) and ammonium perfluorooctanoate (30 g) were charged, and the air in the tank was replaced by VdF. After addition of 6FI (0.5 ml) (25° C.), the pressure was elevated up to 21 kg/cm²G at 80° C. and a 0.4% aqueous solution of ammonium persulfate (10 ml) was added under pressure. Since the pressure began to lower immediately, VdF was introduced under pressure to keep the pressure to a constant level during the polymerization for 4 hours. The product was a white translucent dispersion having a polymer content of 12.3%. The powdery polymer obtained from the dispersion by a conventional procedure showed an intrinsic viscosity [η] of 0.84 (dl/g, 35° C.) in dimethylacetamide, an iodine content of 0.05% and a number average molecular weight of 230,000.

CONTROL EXAMPLE 1

In a 36.6 liter volume autoclave, pure water (15 liters) was charged, and after sufficient replacement of the air in the tank by nitrogen gas, a monomer mixture of VdF and HFP (molar ratio, 65:35) (1100 g) was introduced therein. The inner temperature was raised up to 80° C. under stirring. Then, a solution of ammonium persulfate (25.6 g) in pure water (100 ml) and isopentane (0.2 g) were added thereto under pressure with nitrogen gas to initiate the polymerization. At the same time, an aqueous solution of ammonium persulfate (161 g/liter) previously prepared was introduced under a rate of 1 ml/min in proportion to the decomposition of ammonium persulfate so as to keep the concentration of undecomposed ammonium persulfate in the system to a constant level. Isopentane was also introduced under a rate of 0.0046 g/min in proportion to its consumption so as to keep the concentration of unreacting isopentane in the system to a constant level.

With the progress of the polymerization, the pressure was gradually lowered, so that a monomer mixture of VdF and HFP (molar ratio, 78:22) was supplementally introduced under pressure to keep the reaction pressure to 12 kg/cm²G during the polymerization. After 185 minutes, heating and stirring were stopped, and the monomers in the system were released to stop the reaction. The copolymer (4760 g) taken out from the thus produced aqueous dispersion had a number average molecular weight of 70,000 when determined by the osmotic method and showed a Mooney viscosity (ML$_{1+20}$) of 20° at 140° C. and an intrinsic viscosity [η] of 0.66 (dl/g, 35° C.).

CONTROL EXAMPLE 2

In a 36.6 liter volume polymerization tank, pure water (15 liters) was charged, and after sufficient replacement of the air in the tank by nitrogen gas, a monomer mixture of VdF/HFP/TFE (molar ratio, 46.5:37.0:16.5) (900 g) was added thereto. The inner temperature was raised up to 100° C. under stirring. Then, a solution of ammonium persulfate (180 g) in pure water (503 g) was introduced therein under a rate of 1.49 ml/min.

Since the pressure was lowered with the progress of the polymerization, a monomer mixture of VdF/HFP/TFE (molar ratio, 65.5:17.0:17.5) was supplementally introduced under pressure to keep the reaction pressure to 10 kg/cm²G during the reaction. After 105 minutes, heating and stirring were stopped, and the monomers in the system were released to stop the reaction. The solid content of the thus obtained aqueous emulsion was 22.0%. From a portion of this aqueous emulsion, a ternary copolymer was taken out by a conventional procedure. The intrinsic viscosity [η] was 0.61 (dl/g, 35° C.). The number average molecular weight was 65,000.

CONTROL EXAMPLE 3

In a 36.6 liter volume polymerization tank, pure water (15 liters) was charged, and after sufficient replacement of the air in the tank by nitrogen gas, a monomer mixture of VdF/HFP/TFE (molar ratio, 46.5:37.0:16.5) (900 g) was added thereto. The inner temperature was raised up to 100° C. under stirring. Then, a solution of ammonium persulfate (69 g) in pure water (360 ml) was introduced therein under a rate of 1.0 ml/min.

Since the pressure was lowered with the progress of the polymerization, a monomer mixture of VdF/HFP/TFE (molar ratio, 63.5:18.0:18.5) was supplementally introduced under pressure to keep the reaction pressure to 10 kg/cm²G during the reaction. After 130 minutes, heating and stirring were stopped, and the monomers in the system were released to stop the reaction. The solid content of the thus obtained aqueous emulsion was 25.2%. From a portion of this aqueous emulsion, a ternary copolymer was taken out by a conventional procedure. The intrinsic viscosity [η] was 0.89 (dl/g, 35° C.). The number average molecular weight was 92,000.

CONTROL EXAMPLE 4

The polymerization was carried out in the same manner as in Reference Example 6 but using 2 ml of isopentane in place of 6FI and adopting a reaction time of 6 hours. The product was a white dispersion having a polymer content of 14%. The powdery polymer obtained therefrom by a conventional method showed an intrinsic viscosity [η] of 0.92 (dl/g, 35° C.) in dimethylacetamide and a number average molecular weight of 270,000.

CONTROL EXAMPLE 5

In a 3000 ml volume reaction tank, pure water (1000 ml) and ammonium perfluorooctanoate (7.5 g) were charged. The air in the tank was replaced by a monomer mixture of HFP/VdF (45/55, molar ratio), and the monomer mixture and bromotrichloromethane (0.05 ml) were charged therein to make a pressure of 14 kg/cm$^2$G at 80° C. Further, a solution of ammonium persulfate (1.5 g) in pure water (50 ml) was introduced therein under pressure while stirring. The progress of the polymerization was detected by depression of the pressure. The polymerization was continued for 5 hours, during which a monomer mixture of VdF/HFP/FTM (79/21/0.5, molar ratio) was supplied thereto. Then, the temperature was rapidly lowered and the pressure was reduced to stop the polymerization. The product was a white aqueous dispersion, which was coagulated by freezing, washed and dried to give a rubber (120 g). The bromine content was 0.37%. The intrinsic viscosity [$\eta$] in methyl ethyl ketone was 0.49 (dl/g, 35° C.). The number average molecular weight was 52,000.

For evaluation of the qualities of the thus obtained polymers, blended compositions were prepared by the use of a conventional roll for rubber in the following Examples and Comparative Examples.

EXAMPLE 1

The polymer obtained in Reference Example 1 (1) (shown in the upper column of Table 1) (100 parts), MT-carbon black (20 parts), magnesium oxide (low activity) (15 parts), α,α'-bis(t-butylperoxy)-p-diisopropylbenzene diluted to 40% with calcium carbonate (manufactured by Nippon Oil and Fats Co., Ltd.; "Peroxymon F-40") (5 parts) as the peroxide and triallyl isocyanurate (3 parts) were blended uniformly by a rubber roll, and evaluation of the resultant composition was carried out.

The vulcanization test of the composition was effected by the aid of a JSR curastometer of II type with a mold chamber No. 1 under a frequency of 6 cpm and an amplitude of ±3° at a temperature shown in Table 1, and from the vulcanization test curve, the minimum viscosity ($v_{min}$), vulcanization degree ($v$), induction time ($T_{10}$), optimal vulcanization time ($T_{90}$) and vulcanization velocity (R) were determined. The possibility of molding was judged from the foaming state of the specimen after the test. As to the compositions which were judged to be moldable, a specimen for sheet having a thickness of 1 mm and a specimen for determination of the compression set having a thickness of about 13 mm were subjected to the primary vulcanization under pressure by the use of a designed metal frame and a heat press (160° C.×30 minutes) unless otherwise indicated and then to the secondary vulcanization (200° C.×24 hours) to complete the vulcanization. The determination of the properties of the products was effected according to JIS K-6301. The 100% tension, the tensile strength, the elongation and the compression set were indicated by abbreviations of $M_{100}$, $T_B$, $E_B$ and C.S, respectively.

EXAMPLES 2 TO 15 AND COMPARATIVE EXAMPLES 1 AND 2

The same procedure as in Example 1 was repeated but using the polymer obtained in the corresponding Reference Example or Control Example shown in the upper column of Table 1. The results are shown in Table 1.

In Examples 3, 10, 13, 14 and 15, the following modifications were adopted, respectively.

EXAMPLE 3

The polymer obtained in Reference Example (3) was used and the composition was prepared without MT-carbon black and magnesium oxide. The other conditions were the same as in Example 1.

EXAMPLE 10

The polymer obtained in Reference Example 5 (1) and 6 parts of calcium hydroxide were employed. The other conditions including those of the evaluation were the same as in Example 1.

EXAMPLE 13

The amount of the peroxide in the composition was changed to 7.5 parts. The other conditions including those for the evaluation were the same as in Example 12.

EXAMPLE 14

The polymer mixture (100 parts) obtained by uniformly blending the polymers obtained in Reference Example 5 (1) and 5 (2) in a proportion of 50:50 and 2,5-dimethyl-2,5-di(t-butylperoxy)hexane (2 parts) as the peroxide were employed. The other conditions including those for the evaluation were the same as in Example 12.

EXAMPLE 15

As the peroxide, 2,5-dimethyl-2,5-di(benzoylperoxy)hexane (2.5 parts) was employed. The other conditions including those for the evaluation were the same as in Example 14.

The results of these Examples and Comparative Examples are shown in Table 1.

TABLE 1

| | Example | | | | | | | | | | | Com. Ex. 1 Control Example No. 1 | Example 12 Reference Example No. 5(1)* 5(2) | 13 Reference Example No. 5(1)* 5(2) | Com. Ex. 2 Control Example No. 4 | Example 14 Reference Example No. 5(1)* 5(2) | 15 Reference Example No. 5(1)* 5(2) |
|---|---|---|---|---|---|---|---|---|---|---|---|---|---|---|---|---|---|
| | 1 | 2 | 3 | 4 | 5 Reference Example No. 2(1)* | 6 | 7 | 8 | 9 | 10 | 11 | | | | | | |
| Polymer | 1(1) | 1(2) | 1(3) | 2(3) | 2(3) | 3(2) | 5(3) | 4(2) | 4(1)* 4(2) | 5(1) | 5(2) | | | | | | |
| Vulcanization test (curastometer) | | | | | | | | | | | | | | | | | |
| $v_{min}$ (kg) | 0.01 | 0.52 | 2.00 | 0.79 | 0.26 | 0.13 | 1.70 | 0.11 | 0.01 | 0.01 | 0.53 | 0.25 | 0.19 | 0.16 | 0.01 | 0.15 | 0.21 |
| $v$ (kg) | 2.12 | 2.75 | 4.60 | 2.37 | 2.14 | 2.21 | 4.70 | 2.37 | 1.89 | 1.48 | 2.86 | 0.47 | 2.30 | 2.62 | 0.50 | 2.10 | 1.78 |
| $T_{10}$ (min) | 25.0 | 0.70 | 0.3 | 0.8 | 0.9 | 1.0 | 0.4 | 0.90 | 1.0 | 1.0 | 0.8 | — | 1.0 | 0.7 | — | 1.7 | 0.4 |
| $T_{90}$ (min) | 1.6 | 9.4 | 10.5 | 10.0 | 11.3 | 9.0 | 2.3 | 6.4 | 17.0 | 8.0 | 4.0 | — | 5.4 | 7.3 | — | 16.0 | 1.8 |
| R (min) | 23.4 | 8.7 | 10.2 | 9.2 | 10.4 | 8.0 | 1.9 | 5.5 | 16.0 | 7.0 | 3.2 | — | 4.4 | 6.6 | — | 14.3 | 1.4 |
| Primary vulcanization | 160° C. × 30 minutes | | | | | | | | | | | Foaming occurred; no sheet obtained | 160° C. × 30 minutes | | Foaming occurred; no sheet obtained | 160° C. × 30 minutes | |

TABLE 1-continued

| | Example | | | | | | | | | | | Com. Ex. 1 Control Example No. 1 | Example 12 Reference Example No. 5(1)* 5(2) | Example 13 Reference Example No. 5(1)* 5(2) | Com. Ex. 2 Control Example No. 4 | Example 14 Reference Example No. 5(1)* 5(2) | Example 15 Reference Example No. 5(1)* 5(2) |
|---|---|---|---|---|---|---|---|---|---|---|---|---|---|---|---|---|---|
| Polymer | 1 1(1) | 2 1(2) | 3 1(3) | 4 2(3) | 5 2(1)* 2(3) | 6 3(2) | 7 5(3) | 8 4(2) | 9 4(1)* 4(2) | 10 5(1) | 11 5(2) | | | | | | |
| Secondary vulcanization | 200° C. × 24 hours | | | | | | | | | | | | 200° C. × 24 hours | | | 200° C. × 24 hours | |
| M$_{100}$ (kg/cm$^2$) | 38 | 29 | — | 30 | 36 | 29 | — | 29 | 59 | 34 | 59 | | 43 | 47 | | 40 | 34 |
| T$_B$ (kg/cm$^2$) | 166 | 264 | — | 233 | 189 | 191 | — | 199 | 168 | 130 | 285 | | 225 | 222 | | 214 | 231 |
| E$_B$ (%) | 270 | 420 | — | 410 | 390 | 470 | — | 420 | 290 | 420 | 270 | | 370 | 350 | | 300 | 320 |
| Hardness (JIS, Hs) | 73 | 71 | — | 72 | 74 | 72 | — | 72 | 76 | 74 | 75 | | 75 | 76 | | 75 | 74 |
| Compression permanent set (200° C. × 24 hours, 25% compression) | — | 24 | — | 31 | 30 | 27 | — | 28 | 32 | — | — | | — | — | | — | — |

Note:
The two kinds of the polymers were blended in a proportion of 50:50 (by weight).

From Table 1, the following facts are understood:

(1) In Comparative Examples, the vulcanization degree ($\nu$) is small, and a vulcanized rubber sheet without foaming can be hardly produced. To the contrary, in all Examples, the vulcanization degree ($\nu$) is large, and an excellent vulcanized rubber can be produced.

(2) As to the bromine-containing polymer (Control Example 5), the vulcanization degree ($\nu$) is somewhat increased in comparison with the polymer of Control Example 1. However, in comparison with Examples in which iodine is used, the peroxide-vulcanization is less effective.

(3) The polymer obtained in the first step has only a low molecular weight. But the vulcanization degree ($\nu$) is large enough and the vulcanized rubber obtained shows a 100% tension larger than that of the vulcanized rubber of the high molecular weight polymer obtained in the second or third step. This means that there is formed a highly developed three dimentional structure produced by the peroxide in the presence of the polymer chain and the co-cross linking agent or the accelerating agent.

EXAMPLES 16 TO 18 AND COMPARATIVE EXAMPLES 3 TO 5

Using the polymer shown in the second column of Table 2, a mixture having a composition shown in the third column of Table 2 was uniformly blended by a rubber roll. The vulcanization test was carried out at a temperature of 170° C. in the same manner as above, and the properties were determined according to JIS K-6301. The results are shown in Table 2.

TABLE 2

| Polymer | Example 16 Ref. Ex. 5(1) & 5(2) | Comparative Example 3 Control Example 2 | Example 17 Ref. Ex. 5(2) | Example 18 Ref. Ex. 3(2) | Comparative Example 4 Control Example 3 | Comparative Example 5 Control Example 1 |
|---|---|---|---|---|---|---|
| Composition | | | | | | |
| Polymer (parts) | 100 | 100 | 100 | 100 | 100 | 100 |
| MT-carbon black | 20 | 20 | 20 | 20 | 20 | 20 |
| Magnesium oxide (low activity) | 15 | 15 | | | | |
| Dibasic lead phosphite | | | 15 | 15 | 15 | 15 |
| Calcium hydroxide | 6 | 6 | | | | |
| Bisphenol AF* | 2 | 2 | | | | |
| V-4** | | | 2 | 2 | 2 | 2 |
| DBU-salt*** | 0.50 | 0.50 | | | | |
| Vulcanization test | | | | | | |
| $\nu_{min}$ (kg) | 0.11 | 0.19 | 0.42 | 0.11 | 0.48 | 0.20 |
| $\nu$ (kg) | 1.99 | 1.81 | $\nu_t$ = 2; 0.88 | $\nu_t$ = 2; 0.31 | $\nu_t$ = 2; 0.32 | $\nu_t$ = 2; 0.22 |
| T$_{10}$ (min) | 0.8 | 3.1 | $\nu_t$ = 5; 3.36 | $\nu_t$ = 5; 2.10 | $\nu_t$ = 5; 2.14 | $\nu_t$ = 5; 1.30 |
| T$_{90}$ (min) | 2.3 | 9.5 | $\nu_t$ = 10; 4.18 | $\nu_t$ = 10; 3.13 | $\nu_t$ = 10; 3.25 | $\nu_t$ = 10; 2.20 |
| R (min) | 1.5 | 6.4 | $\nu_t$ = 20; 4.53 | $\nu_t$ = 20; 3.23 | $\nu_t$ = 20; 3.67 | $\nu_t$ = 20; 2.50 |
| Primary vulcanization | 170° C. × 10 min. | | 170° C. × 20 min. | | | |
| Secondary vulcanization | | | 200° C. × 24 hours | | | |
| Physical property | | | | | | |
| M$_{100}$ (kg/cm$^2$) | 74 | 95 | 40 | 34 | 39 | 36 |
| T$_B$ (kg/cm$^2$) | 167 | 162 | 144 | 121 | 137 | 110 |
| E$_B$ (%) | 180 | 150 | 210 | 190 | 220 | 190 |
| Hardness (JIS, Hs) | 80 | 76 | 73 | 71 | 70 | 73 |
| Compression permanent set (200° C. × 24 hours, 25% compression) (%) | 13 | 18 | 39 | 40 | 44 | 46 |

*4,4'-Dihydroxydiphenylhexafluoropropane;
**4,4'-Diaminodicyclohexylmethane carbamate;
***8-Benzyl-1,8-diazabicyclo(5,4,0)-7-undecenonium chloride.

Note:
$\nu_t$ indicating the value of the vulcanization degree ($\nu$) after t minutes.

From Table 2, it is understood that the iodine-containing polymers (Examples 16, 17 and 18) are much superior to the polymers not containing any iodine atom (Comparative Examples 3, 4 and 5) in cross linking property and also in compression permanent set as the quality of vulcanized rubber.

EXAMPLE 19

The determination of $\nu_{min}$ and $\nu$ of each polymer of Reference Example 2 (5), Reference Example 3 (3), Reference Example 6 and Control Example 4 was effected at 160° C. by the use of a curastometer. As to the polymers of Reference Example 3 (3), Reference Example 6 and Control Example 4, the components were blended in a mortar and the determination was carried out at 180° C. The results are shown in Table 3.

TABLE 3

|  | (1) | (2) | (3) | (4) | (5) | (6) | (7) |
|---|---|---|---|---|---|---|---|
| Polymer of Reference Example 2 (5) | 100 | 100 | 100 | 100 | — | — | — |
| Polymer of Reference Example 3 (3) | — | — | — | — | 100 | — | — |
| Polymer of Reference Example 6 | — | — | — | — | — | 100 | — |
| Polymer of Control Example 4 | — | — | — | — | — | — | 100 |
| MT-carbon black | — | — | 20 | 20 | — | — | — |
| Calcium hydroxide | — | — | — | 6 | — | — | — |
| Peroxymon F-40 | — | 5 | 5 | 5 | 8 | 8 | 8 |
| Triallyl isocyanurate | — | — | 3 | 3 | 4 | 4 | 4 |
| Curastometer |  |  |  |  |  |  |  |
| $\nu_{min}$ | 0.16 | 0.09 | 0.07 | 0.14 | 0.10 | 0.05 | 0.10 |
| $\nu$ (after 30 minutes) | — | 0.64 | 1.81 | 2.07 | 0.80 | 1.07 | 0.36 |

In (1), a vulcanized rubber could not be obtained. In (2), foaming was caused but increase of $\nu$ was observed. In (3) and (4), $\nu$ was greatly increased. The values obtained in (4) were as follows: Modular 100 ($M_{100}$) 44, $T_B$ 180, $E_B$ 310, hardeness 74.

The polymer obtained in Control Example 1 was subjected to the same determination, whereby the degree of cross linking ($\nu$) in case of using the peroxide alone was 0.14. It is thus understood that the cross linking efficiency becomes several times larger in the presence of iodine.

EXAMPLE 20

The quality of the polymer obtained in Reference Example 2 (5) through (1) to (3) was evaluated. The polymer (100 parts) was admixed with the peroxide (5 parts) shown in Example 1 to effect the cross linking reaction and molding so as to obtain a transparent sheet, and the steam exposure test (150° C., 7 days) and the heated air exposure test (275° C., 70 hours) were carried out. The results are shown in Table 3.

EXAMPLE 21

To the composition as shown in Example 20, triallyl isocyanurate (3 parts) and calcium hydroxide (6 parts) were admixed, and the same evaluation as in Example 20 was effected. The results are shown in Table 4.

EXAMPLE 22

The polymer (100 parts) obtained in Reference Example 2 (6) was admixed with Peroxymon F-40 (2.5 parts), triallyl isocyanurate (3 parts) and MT-carbon black (10 parts), and the cross linking property was evaluated. The results are shown in Table 4.

EXAMPLE 23

Each of the polymers obtained in Reference Example 3 (2) and Reference Example 1 (2) (100 parts) was admixed with MT-carbon black (20 parts), magnesium oxide (15 parts) and calcium hydroxide (6 parts), and 8-benzyl-1,8-diazabicyclo(5,4,0)-7-undecenonium chloride (hereinafter referred to as "DBU salt") (0.35 part), Peroxymon F-40 (5 parts) and triallyl isocyanurate (3 parts) were incorporated therein. On the other hand, a similar composition was prepared by the use of the polymer obtained in Reference Example 3 (2) without using DBU salt and magnesium oxide. These compositions were subjected to the evaluation. In this Example, the heated air aging test was effected (275° C., 70 hours). The results are shown in Table 4.

TABLE 4

| Example No. | 20 | 21 | 22 | 23 (1) | 23 (2) | 23 (3) |
|---|---|---|---|---|---|---|
| Polymer (Reference Example) | 2 (5) | 2 (5) | 2 (6) | 3 (2) | 1 (2) | 3 (2) |
| Vulcanization |  |  |  |  |  |  |
| $\nu_{min}$ (kg) | 0.43 | 0.88 | 0.70 | 0.12 | 0.48 | 0.05 |
| $\nu$ (kg) | 0.67 | 1.82 | 2.63 | 2.51 | 3.20 | 2.39 |
| $T_{10}$ (min) | 1.4 | 0.6 | 0.7 | 0.9 | 0.6 | 0.8 |
| $T_{90}$ (min) | 14.4 | 4.7 | 9.5 | 2.5 | 2.6 | 2.6 |
| R (min) | 13.0 | 4.1 | 8.8 | 1.6 | 2.0 | 1.8 |
| Primary vulcanization | 160° C. × 30 min |  | — | 160° C. × 30 min |  |  |
| Secondary vulcanization | 200° C. × 24 hours |  | — | 200° C. × 24 hours |  |  |
| Normal state |  |  |  |  |  |  |
| $M_{100}$ (kg/cm$^2$) | 19 | 42 | — | 59 | 59 | 22 |
| $T_B$ (kg/cm$^2$) | 110 | 251 | — | 124 | 172 | 178 |
| $E_B$ (%) | 740 | 570 | — | 240 | 250 | 450 |
| Hardness (JIS, Hs) | 67 | 74 | — | 77 | 76 | 70 |
| After steam treatment at 150° C. for 7 days |  |  |  |  |  |  |
| $T_B$ (kg/cm$^2$) | 137 | 150 | — | — | — | — |
| $E_B$ (kg/cm$^2$) | 640 | 480 | — | — | — | — |
| Hardness (JIS, Hs) | 69 | 85 | — | — | — | — |
| Change of mass (%) | +0.1 | +0.2 | — | — | — | — |
| After heated air aging at 275° C. for 70 hours |  |  |  |  |  |  |
| $M_{100}$ (kg/cm$^2$) | 15 | 30 | — | 61 | 64 | 20 |
| $T_B$ (kg/cm$^2$) | 101 | 91 | — | 70 | 98 | 48 |
| $E_B$ (%) | 720 | 640 | — | 140 | 160 | 500 |
| Hardness (JIS, Hs) | 67 | 75 | — | 84 | 89 | 72 |

What is claimed is:

1. An easily cross linkable free radical catalyzed fluorine-containing polymer substantially comprising: (1) a polymeric chain comprising one or more polymer segments, of which at least one polymer segment consists of units of vinylidene fluoride alone or units of vinylidene fluoride and one or more other fluoroolefins, the content of vinylidene fluoride units being not less than about 10 mol% based on the polymer segment and not less than 10% by weight based on the polymeric chain, and (2) at least one iodine atom liberated from an iodinated compound of the formula: $RI_x$ (wherein R is a saturated or unsaturated fluorohydrocarbon or chlorofluorohydrocarbon residue having 1 to 8 carbon atoms and x is an integer of 1 or 2 corresponding to the bonding valency of the residue R) in an amount of 0.001 to 10% by weight based on the polymer and bonded at a terminal position of the polymeric chain and (3) a fragment of the iodinated compound excluding the said liberated iodine atom therefrom which are bonded to the polymeric chain and being prepared by polymerizing vinylidene fluoride with or without one or more of the other fluoroolefins in the presence of a radical producing source and the iodinated compound (s), the other fluoroolefins being selected from the group consisting of tetrafluoroethylene, chlorotrifluoroethylene, trifluoroethylene, vinyl fluoride, hexafluoropropylene, pentafluoropropylene, perfluoro(methyl vinyl ether), perfluoro(ethyl vinyl ether) and perfluoro-(propyl vinyl ether).

2. The fluorine-containing polymer according to claim 1, wherein the polymer chain consists of only one polymer segment having a number average molecular weight of 8,000 to 400,000.

3. The fluorine-containing polymer according to claim 1, wherein the polymer chain consists of two to four polymer segments, has a number average molecular weight of about 8,000 to 4,000,000.

4. The fluorine-containing polymer according to claim 1, wherein the amount of the iodine atoms bonded to the polymer chain is from about 0.01 to 5% by weight based on the polymer.

5. The fluorine-containing polymer according to claim 1, wherein R is a saturated fluorohydrocarbon or chlorofluorohydrocarbon group.

6. The fluorine-containing polymer according to claim 1, wherein R is an unsaturated fluorohydrocarbon or chlorofluorohydrocarbon group and x is an integer of 1.

7. The fluorine-containing polymer according to claim 1, wherein the polymeric chain consists of the segment of a homopolymer of vinylidene fluoride or a random copolymer of vinylidene fluoride with one or more of the other fluoroolefins, contains units of vinylidene fluoride in an amount of not less than about 10 mol % based on the polymeric chain and has a number average molecular weight of about 8,000 to 400,000.

8. A cross linkable composition which comprises a mixture of (A) the fluorine-containing polymer according to claim 1 and (B) at least one cross linking agent in a weight proportion of 100:0.05–10.

9. The cross linkable composition according to claim 8, wherein the linking agent is selected from the group consisting of organic peroxides, polyamines and their salts polyhydroxy compounds having an enol type hydroxyl group and dihydroxy compounds of the formula: $R''(CH_2OH)_2$ (wherein $R''$ is a polyfluoroalkylene or perchlorofluoroalkylene group having 1 to 20 carbon atoms) and their alkali metal salts, and polythiols and their alkali metals.

10. The cross linkable composition according to claim 9, wherein the cross linking agent is an organic peroxide.

11. The cross linkable composition according to claim 9, wherein the cross linking agent is a polyamine or its salt.

12. The cross linkable composition according to claim 9, wherein the cross linking agent is a polyhydroxy compound having an enol type hydroxyl group or a dihydroxy compound of the formula: $R''(CH_2OH)_2$ (wherein $R''$ is a polyfluoroalkylene or perchlorofluoroalkylene group having 1 to 20 carbon atoms), or their alkali metal salt.

13. The cross linkable composition according to claim 8, which further comprises an acid accepting agent.

14. The cross linkable composition according to claim 13, wherein the acid accepting agent is a divalent metal oxide or hydroxide.

15. The cross linkable composition according to claim 8, which further comprises an accelerating agent.

16. The cross linkable composition according to claim 15, wherein the accelerating agent is selected from the group consisting of tertiary amines, trisubstituted amidines and pentasubstituted guanidines, and their organic acid salts, inorganic acid salts, quaternary ammonium salts and quaternary phosphonium salts.

17. The cross linkable composition according to claim 8, which further comprises a cross linking aid or a co-cross linking agent.

18. The cross linkable composition according to claim 17, wherein the cross linking aid or the co-cross linking agent is a polyfunctional compound.

19. The cross linkable composition according to claim 8, which further comprises an organic peroxide as the cross linking agent and a polyfunctional compound as the cross linking aid or the co-cross linking agent.

20. The fluorine-containing polymer according to claim 1, wherein the iodide compound is the one bearing at least one fluorine atom or perfluorohydrocarbon residue on the carbon atom adjacent to the iodine atom.

* * * * *